United States Patent [19]

Winstead

[11] 3,723,582

[45] Mar. 27, 1973

[54] METHOD FOR RECLAIMING THE SELVAGE OF FOAMED THERMOPLASTIC WEB

[76] Inventor: Thomas W. Winstead, 2 Overlook Lane, Baltimore, Md. 21210

[22] Filed: May 22, 1970

[21] Appl. No.: 39,851

Related U.S. Application Data

[63] Continuation-in-part of Ser. No. 719,057, April 5, 1968, abandoned.

[52] U.S. Cl. ...................... 264/37, 264/53, 264/141, 264/321, 264/DIG. 69
[58] Field of Search....... 264/51, 53, 321, DIG. 4, 37, 264/DIG. 69, 141

[56] References Cited

UNITED STATES PATENTS

| | | | |
|---|---|---|---|
| 3,238,565 | 3/1966 | Jacobs | 264/321 X |
| 3,189,399 | 6/1965 | Jacobs et al. | 264/321 X |
| 3,475,526 | 10/1969 | Seto | 264/321 X |
| 3,531,562 | 9/1970 | Serrano et al. | 264/321 X |
| 2,744,291 | 5/1956 | Stastny et al. | 264/DIG. 4 |
| 3,082,483 | 3/1963 | Bickford | 264/DIG. 4 |
| 3,607,999 | 9/1971 | Corbett et al. | 264/51 X |

OTHER PUBLICATIONS

Collins, F. H. "Controlled Density Polystyrene Foam Extrusion," In SPE Journal, July 1960, pp. 705–709.

*Primary Examiner*—Philip E. Anderson
*Attorney*—Raphael Semmes

[57] ABSTRACT

A method of reclaiming the selvage remaining in an extruded sheet of foamed thermoplastic material after the molding of articles from the sheet, in which the reclaiming steps are integrated with the extrusion and forming steps in a continuous system. Immediately after forming the articles and cutting them from the sheet, the foamed selvage is collapsed and densified before air has penetrated the cells thereof, and thereafter it is granulated, mixed with virgin extrusion pellets, and the mixture is returned to the extrusion step for re-use.

13 Claims, 1 Drawing Figure

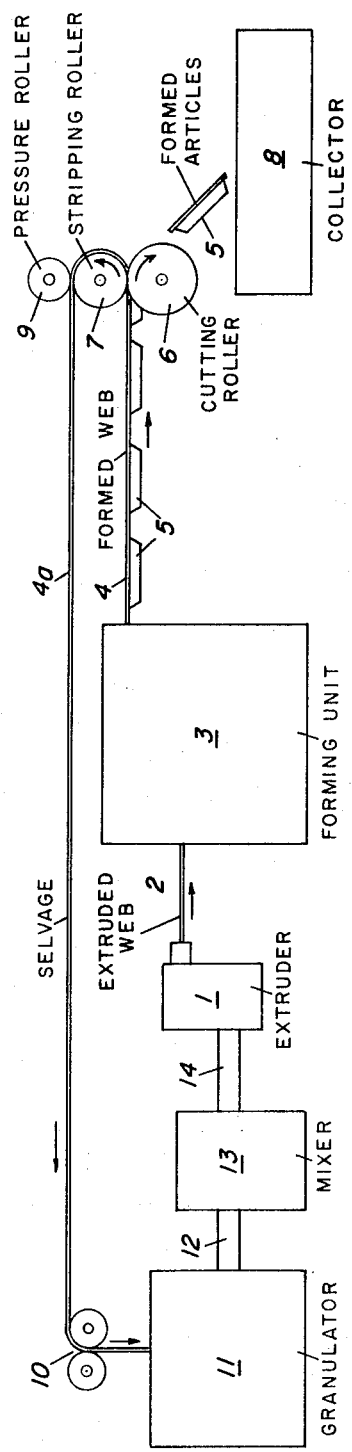

METHOD FOR RECLAIMING THE SELVAGE OF FOAMED THERMOPLASTIC WEB

REFERENCE TO COPENDING APPLICATION

This application is a continuation-in-part of application Ser. No. 719,057, filed Apr. 5, 1968 and now abandoned.

BACKGROUND OF THE INVENTION

This invention relates to a method for reclaiming and beneficially utilizing the selvage or trim remaining in an extruded sheet of foamed thermoplastic material after the vacuum or blow molding of foamed thermoplastic articles, such as trays, plates, cups, etc.

In the manufacture of low cost packaging items, there is an increasing trend toward the use of foamed thermoplastics, and the utilization of low density thermoplastics (of the order of 3 lbs/cu.ft. or less) for such products has resulted in cost performance characteristics competitive with low cost conventional materials such as paper. However, since there is a considerable amount of waste through the selvage or trim resulting from most high speed processes, the efficient re-use of such trim or waste is of particular importance.

In the manufacture of packaging items such as food and produce trays, for example, the trim ordinarily results from the severing of the formed product from a continuous, foamed thermoplastic web. One example of a system of this nature is disclosed in my copending application Ser. No. 480,917, filed Aug. 19, 1965, now U.S. Pat. No. 3,479,694, issued Nov. 25, 1969, covering a high-speed, continuous system in which the steps of extruding the foamed sheet, forming, and cutting follow in continuous, rapid succession. The trim is immediately granulated and continuously fed back into the extruder along with added virgin material. Depending upon the shape of the particular article being manufactured, the ratio of granulated trim to virgin material will vary. In most instances, however, the ratio of granulated trim to virgin material ranges from 25 percent to 50 percent of the total. At these high ratios, when the re-used low density trim is in an expanded state, serious feeding problems can be experienced in the extruder screw, which can be particularly detrimental to a foaming process which depends upon stability within the extruder system for efficient output and good quality.

BRIEF DESCRIPTION OF THE INVENTION

The primary object of the present invention is to provide a method for re-using the trim which normally results from the manufacture of foamed articles of low density, including the steps of densifying the trim by crushing it between smooth rollers without addition of heat and before the blowing agent in the cells of the foam has been replaced by air, and then granulating the densified trim to a relatively small particle size, so that the resultant material is of sufficiently high density to feed and process efficiently in a single screw extruder system.

Another object is to provide a method of this nature which is extremely simple and results in improved efficiencies within the extrusion system.

A further object is to provide a system which facilitates the manufacture of end products of higher quality and more uniform cell size than when using non-densified foamed trim.

Still another object is to provide a method of reclaiming foamed trim by a simple technique which makes possible the re-use of 50 percent or more of the trim.

BRIEF DESCRIPTION OF THE DRAWING

The invention will be further described in conjunction with the accompanying drawing, the single FIGURE of which is a diagrammatic illustration of the invention shown as incorporated in an integrated system for the manufacture of formed articles from foamed or cellular thermoplastics.

DETAILED DESCRIPTION OF THE INVENTION

While the invention may be advantageously used, under appropriate conditions, in a two-stage system wherein the thermoplastic material is extruded and then reheated for thermoforming in a second operation, the greatest benefit from the invention can be obtained if it is incorporated in a single stage system because of the economy effected by the simplicity of the invention in such a system, and because of the ease of densifying the trim, as will later be described. For this reason, the invention is illustrated as integrated in a single stage system, which may, for example, be of the type disclosed in detail in my said copending application Ser. No. 480,917 and now U.S. Pat. No. 3,479,694. The invention is not, however, limited to the details of the extruding, forming, and cutting concepts disclosed in that application, nor is the invention limited to a particular thermoplastic material. The invention may be employed, for example, in reclaiming and re-using trim of foamed polystyrene, polyvinyl chloride, polyvinyl acetate, polyvinyl dichloride, cellulose acetate, cellulose acetate butyrate, vinylidene chloride, methyl methacrylate, and ABS (acrylonitrile, butadiene and styrene), all of which are well known and conventional in the art of forming thermoplastics into articles such as cups or trays. Polystyrene, for example, is readily available in virgin pellet form, of cubical, cylindrical or other shapes, in sizes such as one-sixteenth to one-eighth inch, and with bulk density of the order of 35 to 40 lbs.per cubic foot. Suitable resin stock is available from Foster Grant Co., Inc. of New York, N. Y., Dow Chemical Co., and Shell Chemical Co.

In the diagrammatic drawing, 1 represents a conventional extruder which extrudes a foamed thermoplastic web 2 and feeds it directly to a forming unit 3, which may be either a blow molding or vacuum molding device, as set forth in my aforesaid copending application. The formed web 4 carrying a continuous succession of formed articles, such as trays 5, is fed from the forming unit between the cutting roller 6 and the stripping roller 7 where the formed articles are cut and stripped from the web and deposited in any suitable collector 8, all as described in that application. The remaining trim or selvage 4a passes over the stripping roller 7 between the latter and a pressure-loaded roller 9, from whence it is passed over rollers 10 and fed to a conventional granulator 11, such as a rotating blade type. The granulated material is delivered through a conduit 12 to a mixer 13 where virgin extrusion pellets are added, and thence through a conduit 14 for return to the extruder 1, thus completing the cycle. Merely for purposes of example, it may be assumed that general purpose polystyrene is extruded from a die maintained at 300°F. in a 6 inch width at a feed rate of 128 ft./min., with a final density of 2.5 lbs./cu.ft., and a final thickness of 0.125 inch, and that the temperature of the extrudate reaching the forming station is 230°F. The elapsed time between emergence of material from the forming unit 3 and crushing of the scrap thereof is between 5 and 30 seconds.

In conventional methods of manufacturing foamed trays or the like, wherein a two-stage method is employed, sheeting is first extruded in tubular form and collected in rolls after being slit longitudinally. The sheeting is then reheated for thermoforming in the second operation, which frequently takes place after 24 hours or more have elapsed, and during this period of storage of the rolled foamed sheeting, the blowing agent permeates from the cell walls and is replaced by air. However, in a single stage system, such as above referred to and described in my said copending application Ser. No. 480,917 and now U.S. Pat. No. 3,479,694, the blowing agent is still present within the cell walls at the time the trim is granulated, because very little time has elapsed since the forming operation. Frequently, volatile liquid blowing agents are used which have boiling points between 70°F. and 100°F. Conventional blowing agents of this type include pentane and trichlorofluoromethane. If the trim is cooled below the boiling point of the blowing agent and densifying is carried out before air permeates the cell walls, a negative pressure is developed within the cells, making densification a very simple matter. If, under such conditions, the trim is passed between pinch rollers or crushing rollers, it is easily collapsed and densified into a thinner continuous flat web without the addition of heat and without other complexities which characterize prior systems, and the resulting density after granulation is considerably higher than otherwise. This densification can be effected either between rollers 7 and 9 or between rollers 10 prior to feeding the selvage 4a to the granulator 11. If, however, a period of a half hour or more elapsed after forming and before crushing of the scrap, sufficient air would permeate the cells to make densification significantly more difficult.

In addition to this compression treatment of the trim, a further increase in density may be attained by using a relatively fine screen in the granulator 11 to produce small particle sizes. For example, frequently in sheet trim granulation, a screen is used with holes of three-sixteenths inch to three-eighths inch, and I have found that using a screen between one-sixteenth inch and three-sixteenths inch produces a significantly higher density.

The amount of pressure required and the magnitude of other variables is relative. Typically, rollers of approximately 3 inches to 4 inches in diameter are used for densifying the trim, and pressure in the order of 20 to 50 lbs. per linear inch have been found adequate. Density of the granulated trim can easily be doubled over that possible without using the technique of the present invention. For example, with a low density, foamed trim having a density of 3 lbs. per cubic foot when granulated in the conventional manner, the resulting material might have a bulk density of 2 to 5 lbs. per cubic foot, depending upon screen size. However, by using the method of the present invention, wherein the trim is first densified by the use of pressure rollers, and then passed through a 3/32 inch diameter screen, the bulk density can be increased to from 6 to 15 lbs. per cubic foot. In the case of polystyrene, the bulk density of the raw extrusion compound is in the order of 30 to 35 lbs. per cubic foot.

By using a relatively small screen in the granulator 11, not only is the bulk density of the granulated trim increased, but also the physical size of the individual particles is such that they appear to fill the natural voids between virgin extrusion pellets and, at least to some extent, thereby further optimize the overall bulk density of the mixture.

The simple technique of this invention permits the continuous re-use of up to 50 percent or more of the trim for admixture with virgin material, without requiring heating, cooling, or re-extrusion of the trim in the reclaiming process, without requiring blending and lubricants, and without interruption. Hence, one can appreciate the advantage of this technique when considering the combined bulk density of a 50—50 mixture (by weight) of granulated trim and virgin pellets, a far more advantageous mixture than has heretofore been possible.

While the invention has been described as particularly adaptable for a single-stage system, as before stated, it is possible to gain some benefits if used in a two-stage system. For example, in some instances, a two-stage system reheats and forms immediately or shortly after the extrusion operation, and, in these cases, the effectiveness of the densifying method of this invention may well be utilized. One of the primary advantages of the invention resides in the fact that it permits the immediate re-use of the trim and retains the residual blowing agent which represents a considerable reduction in cost.

From the foregoing, it is believed that the invention may be readily understood by those skilled in the art without further description, it being borne in mind that numerous changes may be made in the details disclosed without departing from the spirit of the invention.

I claim:

1. In a method of manufacturing articles from foamed thermoplastic polymeric resin sheet with a density no more than substantially 3 lbs./cu.ft., wherein melted foamable thermoplastic polymeric resin stock is mixed with a volatile liquid blowing agent and is extruded as a sheet at a temperature above the boiling point of the blowing agent and wherein the articles are molded sequentially from the sheet and cut therefrom to leave a selvage web, the improvement which comprises collapsing and densifying the selvage web by the application of pressure thereto, without additional heat, after the temperature of the selvage web has dropped below the boiling point of the blowing agent and before air has penetrated the cells of the selvage web, granulating the densified selvage web, mixing the granulated selvage web with virgin foamable thermoplastic polymeric resin pellets to constitute foamable thermoplastic polymeric resin stock, and continuing the extrusion of said sheet from such stock.

2. In a method as claimed in claim 1, wherein the sheet is continuously fed during the extruding and cutting steps, said selvage web being fed continuously and being collapsed and densified and granulated while fed continuously.

3. In a method as claimed in claim 2, the granulating of the selvage web comprising cutting the selvage web into particles and screening said particles.

4. In a method as claimed in claim 3, the particles being screened to a particle size in the range from substantially one-sixteenth inch to substantially three-sixteenths inch.

5. In a method as claimed in claim 3, the screened particles filling the voids between pellets and providing a more continuous mass for extrusion.

6. In a method as claimed in claim 2, the thermoplastic polymeric resin stock being at least 25 to 50 percent granulated selvage web by weight.

7. In a method as claimed in claim 2, said selvage web being collapsed and densified and granulated before blowing agent remaining in the cells thereof has escaped, whereby the retained blowing agent in the granulated selvage web is re-used.

8. In a method as claimed in claim 2, said selvage web being collapsed substantially uniformly to produce a substantially flat sheet for granulating.

9. In a method as claimed in claim 2, the blowing agent having a boiling point in the range from substantially 70°F. to substantially 100°F.

10. In a method as claimed in claim 2, the selvage web being densified to a density within the range of from substantially 6 lbs./cu.ft. to substantially 15 lbs./cu.ft.

11. In a method as claimed in claim 2, the selvage web being collapsed and densified and granulated without the addition of other materials thereto.

12. A method in accordance with claim 1, wherein the polymeric resin stock is selected from the group consisting of polystyrene, polyvinyl chloride, polyvinyl acetate, polyvinyl dichloride, cellulose acetate, cellulose acetate butyrate, vinylidene chloride, methyl methacrylate, and acrylonitrile butadiene styrene.

13. A method in accordance with claim 1, wherein the collapsing and densifying is performed of the order of 5 to 30 seconds after the molding.

* * * * *